O. H. ESCHHOLZ.
ELECTRIC ARC WELDING SYSTEM.
APPLICATION FILED OCT. 6, 1919.
1,343,203.
Patented June 15, 1920.
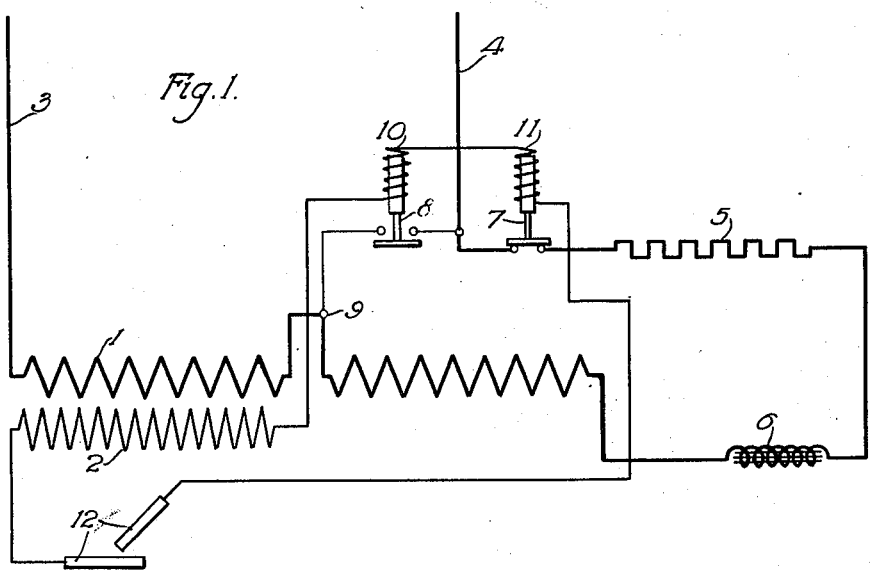
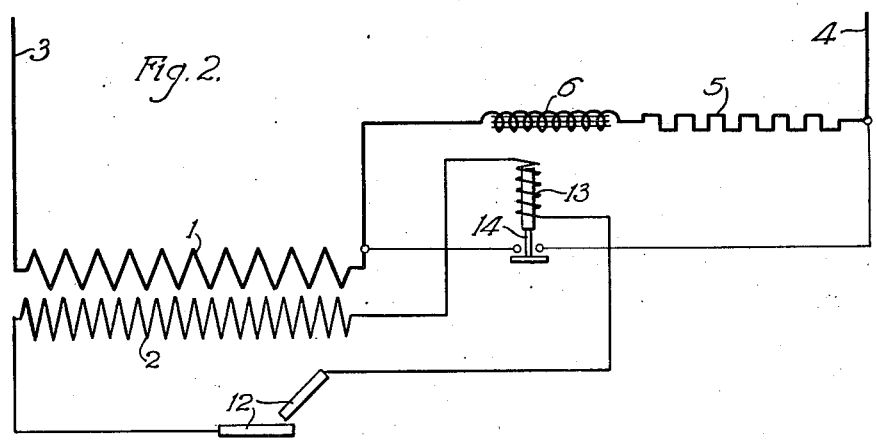
WITNESSES:
INVENTOR
Otto H. Eschholz.
BY
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,203.

Specification of Letters Patent. Patented June 15, 1920.

Application filed October 6, 1919. Serial No. 328,772.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electric-Arc-Welding Systems, of which the following is a specification.

My invention relates to arc welding systems, and, more particularly, to alternating-current arc welding systems, and it has, for its primary object, the provision of alternating-current welding systems which shall possess exceptionally good starting and operating characteristics.

Although alternating-current welding systems have been found to possess certain desirable features, they are also known to possess certain disadvantages which, if not overcome, materially limit the extent of their application. For example, it has been found difficult to establish an arc by means of alternating current and such a disadvantage necessitates the employment of skilled operators to insure strong and homogeneous welds, particularly in view of the fact that the number of interruptions in the process affect the strength of the weld.

One object of my invention, therefore, is to provide alternating-current welding systems in which the starting and operating characteristics shall be such as to insure strong and homogeneous welds being produced by moderately skilled workmen.

I have found that the majority of the objections to alternating-current welding systems may be overcome by employing a relatively high voltage, but the use of a relatively high voltage introduces the hazard of subjecting the operator to electrical shock, which is also undesirable. In order to protect the operator, I have provided, by my invention, means for establishing a low open-circuit voltage in an alternating-current welding system in which a relatively high starting and operating voltage is utilized.

A still further object of my invention is to provide auxiliary equipment for protecting the operator against possibilities of electrical shock by reducing the open-circuit voltage to a relatively low value which shall not materially complicate the system or increase its weight or bulk to an objectionable extent with regard to commercial application.

With these and other objects in view, my invention will be more fully described, illustrated in the drawings, in the several views of which corresponding numerals indicate like parts, and then particularly pointed out in the claims.

In the drawings, Figure 1 is a diagram of a welding system embodying my invention, and Fig. 2 is a diagram of a welding system illustrating a modification of my invention.

In practising my invention, I provide an alternating-current welding system by employing a transformer having primary and secondary windings, the secondary winding of which is directly connected to a plurality of electrodes. The primary winding is, of course, adapted to be connected to an alternating-current supply circuit and I prefer to employ an impedance device, connected in series with the primary winding, which may be shunted from the primary circuit under operating conditions. The impedance device, of course, effects a reduction of voltage in the secondary winding when it is connected in series with the primary winding. The voltage may be further reduced by employing, in addition, a tap on the primary winding in such manner that the number of turns included in the primary circuit may be varied, depending upon whether open-circuit or operating conditions exist. It will be appreciated that, if the number of turns in the primary winding are increased, the voltage across the secondary winding will be reduced and, conversely, if the number of turns in the primary winding are decreased, the voltage across the secondary winding will be increased. I employ, therefore, means for reducing the voltage across the secondary winding under open-circuit conditions by inserting an additional number of turns in the primary winding and by also connecting an impedance device in series therewith.

I have shown, also, a modification of my invention which contemplates the insertion of an impedance device in series with the primary winding under open-circuit conditions, thereby reducing the voltage across the secondary winding, and therefore, between the electrodes. In order to obtain a reduction of voltage, corresponding to that obtained by the employment of the combination of the additional number of turns in the primary winding and the impedance device, by utilizing only an impedance device connected in series with the primary winding, the value of the impedance must necessarily be higher than in the first case. However, an advantage is gained in that the switching means necessary for insserting and shunting the impedance is less complicated, and, therefore, more desirable. In either instance, however, the control is automatic and, therefore, it permits the operator to give his entire attention to the production of good welds. Furthermore, shock hazards to the operator cannot be produced by reason of carelessness on his part.

In Fig. 1 is shown a transformer comprising a primary winding 1 and a secondary winding 2, the primary winding being adapted to be connected to an alternating-current supply circuit (not shown) by conductors 3 and 4. A resistor 5 and a reactance device 6 are connected in series with the primary winding 1 and in series with a switch 7, which is normally in its closed position. A switch 8 is connected between the conductor 4 and a tap 9 on the primary winding to provide a shunt circuit which, when closed, decreases in the number of turns in the primary winding 1 and shunts the resistor 5 and the reactance device 6 from the primary circuit. The secondary winding 2 is connected in series with an actuating coil 10 of the switch 8, an actuating coil 11 of the switch 7 and a plurality of electrodes 12.

Under open-circuit conditions, the switch 7 is in its closed position and the switch 8 is in its open position, the resistor 5 and the reactance device 6 being, therefore, connected in series with the primary winding 1, the total number of turns of which are included in the primary circuit. The resistor 5 serves to reduce the current value in the primary circuit under open-circuit conditions and the reactance device 6 prevents current rushes and, since the total number of turns are included in the primary circuit, the voltage per turn in the winding is reduced. It will be appreciated, therefore, that, under open-circuit conditions, that is, when the electrodes are separated and no arc is established between them, the voltage between the elecrodes is reduced to a value which obviates the danger of electrical shock to the operator.

When the electrodes are engaged, preliminary to establishing an arc, the coils 10 and 11 are energized and cause the switch 8 to be closed and the switch 7 to be opened, thereby shunting the resistor 5 and the reactance device 6 from the primary circuit and reducing the number of turns in the primary winding. A suitable operating voltage is thus made available between the electrodes 12 as soon as the secondary circuit is closed. If, for any reason, the arc is broken and the secondary circuit opened, the coils 10 and 11 are immediately deënergized and permit the switch 8 to open and the switch 7 to close, thereby reëstablishing open-circuit conditions and, consequently, reducing the voltage across the secondary winding.

In Fig. 2 is shown a modification of my invention in which the reactance device 6 and the resistor 5 are connected in series with the primary winding 1, as above described. The secondary winding 2 is connected in series with the actuating coil 13 of a switch 14 and the electrodes 12. The relay switch 14 controls a shunt circuit for the resistor 5 and the reactance device 6.

The system, shown in Fig. 2 operates in substantially the same manner as the welding system shown in Fig. 1. For example, when it is desired to weld, the primary winding 1 is connected to a suitable source of alternating current. When the electrodes 12 are engaged, current traverses the secondary circuit and the coil 13 is energized to cause the switch 14 to shunt the resistor 5 and the reactance device 6 from the primary circuit, whereby the voltage across the secondary winding, or across the electrodes 12, is increased. Any interruption of the arc drawn between the electrodes establishes open-circuit conditions in the secondary circuit and the coil 13 is deënergized to permit the switch 14 to open the shunt circuit, thereby inserting impedance in the primary circuit and reducing the voltage across the electrodes.

It will be appreciated, from the foregoing description, that I have provided means for positively protecting the operator against shock hazards when welding by means of alternating current of relatively high voltage. A desirable commercial welding system may, therefore, be provided which possesses starting and operating characteristics comparable to a direct-current welding system. Furthermore, the alternating-current welding system thus provided possesses the advantageous features of relatively low cost of installation and of portability. The means employed for protecting the operator does not complicate the system or materially increase its expense or weight, and, since it requires no adjustment or additional attention on the part of the operator, a distinct advantage is gained.

Although I have shown and specifically described a plurality of welding systems which may be provided by my invention, it is obvious that minor changes may be made in the apparatus employed and in its connection and disposition in the systems, and I desire, therefore, that no limitations shall be imposed except such as are indicated in the appended claims.

I claim as my invention:—

1. An arc welding system comprising a transformer having primary and secondary windings, a plurality of electrodes connected to the secondary winding, means for varying the number of turns of the primary winding and means for varying the impedance of the primary circuit.

2. An arc welding system comprising a transformer having primary and secondary windings, a plurality of electrodes connected to the secondary winding, means for varying the number of turns of the primary winding and means, controlled by the secondary current, for varying the impedance of the primary circuit.

3. An arc welding system comprising a transformer having primary and secondary windings, a plurality of electrodes connected to the secondary winding, an impedance connected in series with the primary winding, means for shunting the impedance from the primary circuit and means for varying the number of turns of the primary winding.

4. An arc welding system comprising a transformer having primary and secondary windings, a plurality of electrodes connected to the secondary winding, an impedance connected in series with the primary winding, means for shunting the impedance from the primary circuit and means, controlled by the secondary current, for varying the number of turns of the primary winding.

5. An arc welding system comprising a transformer having primary and secondary windings, a plurality of electrodes connected to the secondary winding, an impedance connected to the primary winding, a switch connected in parallel relation to the impedance and a switch-actuating coil connected in series with the secondary winding.

6. An arc welding system comprising a transformer having primary and secondary windings, a plurality of electrodes connected to the secondary winding, an impedance connected in series with the primary winding, a switch connected in parallel relation to the impedance and certain turns of the primary winding and a switch-actuating coil connected in series with the secondary winding.

In testimony whereof, I have hereunto subscribed my name this 30th day of Sept., 1919.

OTTO H. ESCHHOLZ.